United States Patent
Meier et al.

(10) Patent No.: US 11,607,834 B2
(45) Date of Patent: Mar. 21, 2023

(54) APPARATUS AND METHOD FOR FORMING PLASTIC PREFORMS INTO PLASTIC CONTAINERS WITH IMPROVED RINSING ROD ARRANGEMENT

(71) Applicant: KRONES AG, Neutraubling (DE)

(72) Inventors: Dominik Meier, Parsberg (DE); Thomas Hoellriegl, Teublitz (DE)

(73) Assignee: KRONES AG

( * ) Notice: Subject to any disclaimer, the term of this patent is extended or adjusted under 35 U.S.C. 154(b) by 0 days.

(21) Appl. No.: 17/494,642

(22) Filed: Oct. 5, 2021

(65) Prior Publication Data
US 2022/0105669 A1  Apr. 7, 2022

(30) Foreign Application Priority Data
Oct. 5, 2020  (DE) ...................... 10 2020 125 957.3

(51) Int. Cl.
*B29C 49/12*  (2006.01)
*B29C 49/42*  (2006.01)
(Continued)

(52) U.S. Cl.
CPC .......... *B29C 49/4289* (2013.01); *B29C 49/12* (2013.01); *B29C 49/1212* (2022.05);
(Continued)

(58) Field of Classification Search
CPC ... B29C 49/12; B29C 49/121; B29C 49/1212; B29C 49/1216; B29C 49/4289; B29C 2049/6271
See application file for complete search history.

(56) References Cited

U.S. PATENT DOCUMENTS

| | | | |
|---|---|---|---|
| 6,485,669 B1 | 11/2002 | Boyd et al. | ................... 264/521 |
| 2011/0024953 A1* | 2/2011 | Winzinger | .............. B29C 49/12 |
| | | | 425/526 |

(Continued)

FOREIGN PATENT DOCUMENTS

| | | | |
|---|---|---|---|
| DE | 10 2011 008 132 | 7/2012 | ............. B29C 49/12 |
| DE | 10 2009 061 262 | 6/2020 | ............. B29C 49/42 |

(Continued)

OTHER PUBLICATIONS

Machine translation of EP 2669070 A1 to Winzinger dated Dec. 2013. (Year: 2013).*

(Continued)

*Primary Examiner* — Robert B Davis
(74) *Attorney, Agent, or Firm* — Hayes Soloway P.C.

(57) ABSTRACT

An apparatus for forming plastic preforms into plastic containers, includes at least one forming station which forms the plastic preforms into the plastic containers by applying a flowable medium to the plastic preforms, wherein the forming station includes a blow mold, and a rod-like body which is insertable into the plastic preforms via a mouth of the plastic preforms, and a moving device which is configured for moving the rod-like body in the longitudinal direction of the plastic performs. The rod-like body has a channel for guiding the flowable medium, and the forming station has a valve device controlling the supply of the flowable medium into the channel. The valve device is arranged on the moving device and/or a ratio between an inner diameter of the rod-like body and an outer diameter of said rod-like body is, at least in sections, smaller than or equal to 0.5.

18 Claims, 3 Drawing Sheets

(51) Int. Cl.
 *B29L 31/00* (2006.01)
 *B29C 49/62* (2006.01)
(52) U.S. Cl.
 CPC .............. *B29C 2049/6271* (2022.05); *B29L 2031/7158* (2013.01)

(56) References Cited

U.S. PATENT DOCUMENTS

2016/0332355 A1 * 11/2016 Rymann .................. B29C 49/12
2018/0134537 A1    5/2018 Clusserath et al. ... B76C 3/2614

FOREIGN PATENT DOCUMENTS

EP         2669070 A1 * 12/2013   ......... B29C 49/4289
EP        2 987 612       2/2016   ............. B29C 49/46

OTHER PUBLICATIONS

European Search Report issued in EPO Patent Appln. Serial No. 21195858.2-1014, dated Feb. 11, 2022, with English translation, 14 pages.

* cited by examiner

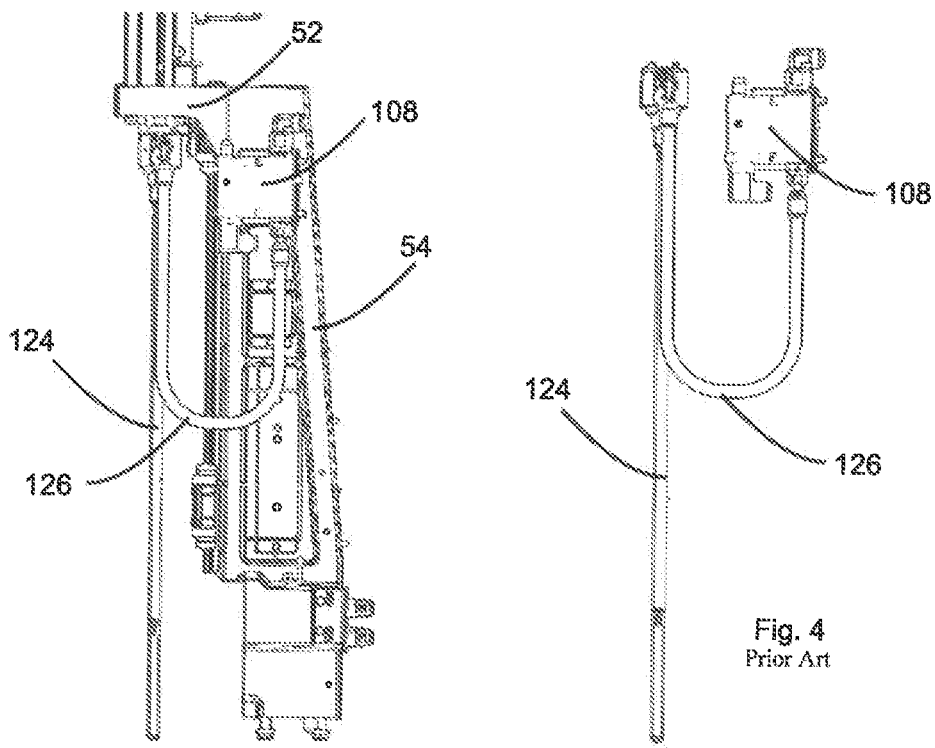
Fig. 3
Prior Art
Fig. 4
Prior Art
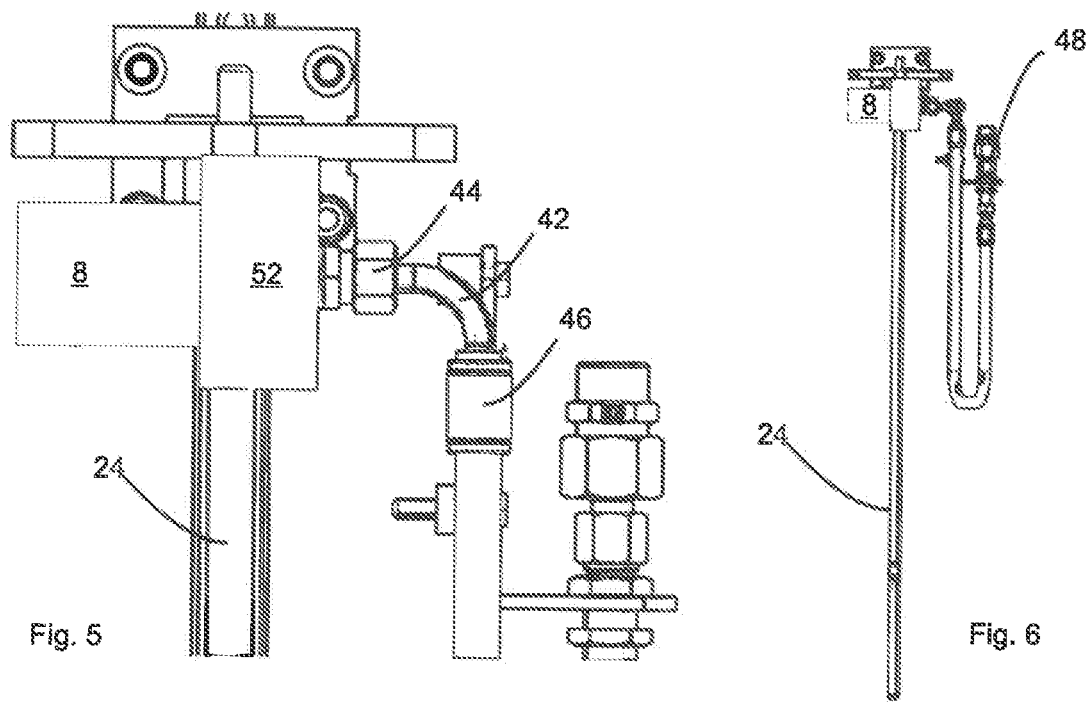
Fig. 5
Fig. 6

APPARATUS AND METHOD FOR FORMING PLASTIC PREFORMS INTO PLASTIC CONTAINERS WITH IMPROVED RINSING ROD ARRANGEMENT

BACKGROUND OF THE INVENTION

The present invention relates to an apparatus in a method for forming plastic preforms into plastic containers. Such apparatus and methods have been known in the prior art for a long time. In this regard, it has also been known from the prior art for a long time that so-called stretching bars are used which also stretch the plastic preforms in their longitudinal direction during the expansion process. In addition, systems are also known in which these stretching rods are designed as rinsing rods, for example have an air guide channel, so that air can also be guided directly to the bottom of the container during the expansion process. With such rinsing air systems, the bottom center of the formed bottle is actively cooled in blowing machines known in the prior art. This process achieves dimensional stability of the bottle or container in a shorter time and higher machine outputs are possible.

Rinsing air is also used in the so-called heat-set process to actively cool certain areas of the container after they have been formed and thus ensuring dimensional stability in a shorter time.

For this purpose, a rinsing air unit is located on a stretching module of a blow station. Usually a stationary rinsing air valve is provided, as well as a working air line and the cooling and/or purge rod moved by a stretching motor. As mentioned, this cooling or rinsing rod is hollow drilled. The working air coming from the rinsing air valve is conducted via the hose through the bore to the bottom centre of the container or plastic preform to be expanded.

In this way, there is a significant dead space between the rinsing air valve, which is stationary with respect to the blow station, and the bottom center of the container to be cooled. The dead space volume is composed of the line volumes and the volume of the rinsing rod bore. This volume is additionally consumed during each blowing process. In this way, the air consumption of the machine is increased and the economic efficiency for the customer is reduced by high operating costs.

In addition, in the current state of the art, the cooling rods are designed as cylindrical tubes, which are usually manufactured from a high-strength round stainless steel material by means of deep hole drilling. This means that the cooling rods have a diameter ratio of more than 60 from the inner diameter to the outer diameter over at least 40% of their length, due to the technical limitations of the manufacturing processes. Typical lengths for such cooling rods are between 600 and 900 mm.

Due to the high diameter ratio, large spaces filled with rinsing fluid and thus considerable dead spaces are created over large parts of the rod-like bodies or cooling rods. This increases the air consumption in the system. Furthermore, due to the slim design of the cooling rods and their axial pressure load, they are very susceptible to buckling. The large ratio between the inner and outer diameters further exacerbates this problem. For this reason, the state of the art usually uses stronger or harder, but also more expensive, stainless steel alloys as the starting material.

The present invention is therefore based on the object of reducing and/or avoiding the dead space in such processes and/or reducing the air consumption for the expansion of the containers. In addition, more stable devices which are less susceptible to damage are also to be created.

SUMMARY OF THE INVENTION

An apparatus according to the invention for forming plastic preforms into plastic containers has at least one forming station which forms the plastic preforms into the plastic containers by the application of a flowable medium, wherein the forming station having a blow mould which in turn forms a cavity, inside which the plastic preforms can be formed into the plastic containers, and wherein the forming station furthermore has an application device which acts upon the plastic preforms with the flowable medium, and a rod-like body which can be introduced into the plastic preforms via a mouth of the plastic preforms. Further, a moving device is provided which is suitable and intended to move said rod-like body in the longitudinal direction of the plastic preforms, wherein said rod-like body forming a channel for conducting the flowable medium. Further, the forming station comprises valve device controlling the supply of the flowable medium into said channel.

According to the invention, this valve device is arranged on the moving device and/or in the ratio between an inner diameter of the rod-like body and the outer diameter of the rod-like body, is at least in sections and preferably completely less than or equal to 0.5.

Therefore, two measures are proposed, both of which, however, are intended to reduce the dead space volume. At the first measure, this valve device is not arranged stationary as before, but directly at the moving parts, which also move the rod-like bodies (in the following also called stretching rod). In this way, longer connecting lines can be saved and thus also dead space volume.

The second proposal refers to the stretching or rinsing rod, or the rod-like body itself, and proposes a reduction of its internal volume. In order to reduce the dead space consisting of the line volume of the working air line and the volume of the bore of the rinsing rod or rod-like body, the position of the rinsing air valve, i.e. the valve device, is changed.

In the preferred embodiment, the valve here is attached directly to the moving device, for example a stretching carriage. In this way, the shut-off point of the rinsing air is moved closer to the rinsing air outlet at the selected points of the container and the dead space volume is thereby considerably reduced.

Preferably, a working air supply of the rinsing air valve is carried out via a working air feed. If the rinsing air valve should still require control air, this can also be transferred via a control air feed, for example from a low-pressure distribution of the blowing station, to the rinsing air valve, which is preferably arranged on a stretching carriage. Furthermore, the control air can also be generated directly to the stretching carriage, for example from the working air by means of a pressure reduction. In this variant, only the working air supply is required.

In the second embodiment, as mentioned above, a cooling rod is used, which is particularly preferably a seamless drawn tube having a ratio between the inner diameter and the outer circumference of less than or equal to 0.5. In addition, a semi-finished product made of steel can also be used. Preferably, as described in more detail below, this is a low-alloy steel which preferably has a coating. This coating can thereby also optimize corrosion properties and conductive properties.

Preferably, the ratio between the inner diameter and the outer diameter is less than 0.5 in at least 50% of the rod-like body, preferably in at least 60%, preferably in at least 70%, preferably in at least 80% and preferably in at least 90% and particularly preferably along the entire length of the rod-like body.

Preferably, the ratio between the inner diameter and the outer diameter is less than 0.48, preferably less than 0.45, preferably less than 0.43, preferably less than 0.41, preferably less than 0.4, and preferably less than 0.38.

Particularly preferably, the rod-like body is a tube and in particular a cylindrical tube. The procedures described here can reduce the dead space overall.

In a preferred embodiment, the moving device comprises a carriage moving in a longitudinal direction and in particular a longitudinal direction of the rod-like body. In particular, this longitudinal direction is also a longitudinal direction of the plastic preform to be expanded.

Particularly preferably, as mentioned above, the rod-like body is also a stretching rod, that is, the rod-like body preferably also performs the function of stretching the plastic preform in its longitudinal direction.

In a further preferred embodiment, the above-mentioned blow mold parts are arranged on blow mold carrier parts. These can be opened and closed, in particular for feeding a plastic preform into the blow mold and for removing a manufactured container from the blow mold. In a further advantageous embodiment, the apparatus comprises a carrier and in particular a rotatable carrier on which a plurality of forming stations are arranged. In this regard, all of these forming stations preferably comprise respective blow molds and the rod-like bodies described herein.

Preferably, the flowable medium described above is air and in particular compressed air. However, it would also be possible for the flowable medium to be a liquid, wherein, for example, the container is both expanded and filled with the medium to be filled.

In a further advantageous embodiment, the valve device is arranged in proximity to the rod-like body. For example, the rod-like body may already be inserted into a housing of the valve device. In this way, the dead space can be further reduced. In a further advantageous embodiment, the rod-like body has an opening on the end face or end side for rinsing the plastic containers. In this case, this opening is arranged in particular on that end side which is opposite the valve device, and the channel extends from the valve device to this opening.

Preferably, the application device described above is a blowing nozzle. In particular, it is an application device which is applied to the mouth of the plastic preform in order to expand it.

Preferably, the plastic preform described herein is acted upon with several pressure stages, such as a pre-blow pressure, an intermediate blow pressure, and a final blow pressure.

In a further preferred embodiment, a length of the rod-like body is greater than 300 mm, preferably greater than 400 mm, preferably greater than 500 mm, preferably greater than 550 mm and preferably greater than 600 mm. In a further preferred embodiment, a length of the rod-like body is less than 1500 mm, preferably less than 1300 mm, preferably less than 1200 mm, preferably less than 1000 mm and preferably less than 900 mm.

In a further preferred embodiment, a movement of the valve device is at least temporarily and preferably fully coupled to the movement of the rod-like body, i.e. the stretching rod. Thus, it is possible that the valve device and the rod-like body are arranged on the same carrier.

In a further preferred embodiment, the valve device is pressure balanced. This design offers the advantage that only those forces are applied to reliably shut off a working air line. In this way, the valve can be designed to be very small and light. A stretching carriage and the moving mass can also be kept very small in this way. For example, the valve device could have a preloading device that only opens and/or closes at a certain pressure.

In a preferred embodiment, the valve device is therefore designed in such a way that one side of the valve piston, in particular its rear side, is also acted upon with a predetermined pressure. In this case, the piston forces on the sealing side of the piston and the side facing away from the sealing are preferably selected to be substantially equal in size or equal in magnitude. Preferably, these piston forces differ from each other by no more than 30%, preferably by no more than 20%, preferably by no more than 10% and preferably by no more than 5%.

In a preferred embodiment, the valve device is a pneumatically actuated valve. In this embodiment, a control air feed is also provided, which serves to actuate the valve device. As mentioned above, this control air can thereby also be branched off from a working air line in a pressure-reduced form. Preferably, the valve device is arranged at a section of the rod-like body and in particular at an end section. Thus, it is possible that an outlet connects the valve device directly to the rod-like body to further reduce dead space.

In a further preferred embodiment, the rod-like body is made of a metal and in particular of a steel. In this way, the stability of the rod-like body can be increased.

In a further preferred embodiment, the rod-like body is coated at least in sections and in particular is coated at least at intervals on its outer surface. Preferably, the rod-like body is coated on its entire outer surface and/or also on its inner surface. By means of this coating, for example, an anti-corrosion capability can be achieved and/or a coating which increases the sliding properties of the rod-like body.

Particularly preferably, the rod-like body extends through an application device such as a blowing nozzle at least at one working operation. Particularly in this embodiment, a coating of the body may improve the sliding properties of the rod-like body. Particularly preferably, the rod-like body is coated with a substance selected from a group of substances comprising chromium, nickel and/or plastic.

In a further preferred embodiment, the material of the rod-like body is a semi-finished product. A semi-finished product is generally referred to as a prefabricated material, that is to say a prefabricated raw material and/or workpieces or semi-finished products of simple shape.

These generally comprise a single material which has merely been formed into a basic geometric shape, for example into a cylindrical shape. For example, the semi-finished product may be a sectional steel.

By the procedure described here with regard to the rod-like body, a reduction in the dead space volume in the rinsing air system can be achieved, as mentioned above. In addition, the costs for manufacturing can also be reduced, since the starting material steel is cheaper than the above-mentioned stainless steel compounds. Besides this, the stability of the rod-like body can also be improved.

The present invention is further directed to a rod-like body for stretching plastic preforms, in particular in the longitudinal direction thereof, wherein the rod-like body has a channel for conducting a flowable medium (and in particular the rod-like body has a bore extending in the longitudinal direction thereof) and the rod-like body has a predetermined outer diameter and a predetermined inner diameter and the rod-like body has a length which is between 500 and 1000 mm.

According to the invention, the rod-like body is made of one part and in particular of steel around a ratio between the inner diameter and the outer diameter is less than or equal to 0.5.

It is therefore also claimed for the rod-like body, which is used in particular as a stretching rod, to have a ratio between the inner diameter and the outer diameter of less than 0.5. The inner diameter of the rod-like body is preferably also the diameter of the channel for conducting the flowable medium.

Preferably, the rod-like body has at least one and preferably two end openings and/or the channel extends completely through the longitudinal direction of the rod-like body. Preferably, the diameter of the channel is constant along the longitudinal direction of the rod-like body.

Preferably, this channel is formed as a bore extending in the longitudinal direction of the rod-like body, preferably completely in the longitudinal direction. Preferably, this bore has a cylindrical cross-section. By designing this bore, as mentioned above, the dead space volume of corresponding installations using this rod-like body can be improved.

The present invention is further directed to a method for forming plastic preforms into plastic containers and, in particular, plastic bottles, wherein at least one forming station forms the plastic preforms into the plastic containers by being acted upon by a flowable medium and, in particular, by a gaseous medium, and wherein the forming station comprises a blow mould which forms a cavity, inside which the plastic preforms are formed into the plastic containers, and wherein the forming station further comprises an application device which acts upon the plastic preforms with the flowable medium and a rod-like body which is introduced into the plastic preforms via a mouth of the plastic preforms, and further a moving device moves this rod-like body in the longitudinal direction of the plastic preforms, in particular in order to stretch the plastic preforms.

Further, said rod-like body has a channel for conducting the flowable medium (or the flowable medium is conducted through a channel located in the rod-like body) and a valve device of the forming station controls the supply of the flowable medium in said channel.

According to the invention, this valve device is arranged on the moving device and/or a ratio between an inner diameter of the rod-like body and the outer diameter of the rod-like body is at least in sections and preferably completely smaller than 0.5.

Therefore, it is also proposed on the method side that the valve is arranged closer to the rod-like body and/or the latter has the above-mentioned diameter ratios, as compared to the prior art.

In a preferred method, the plastic preforms are formed into containers during a transport by a transport device from the forming stations.

In a further preferred method, a pressure-balanced valve device is used as the valve device, or the valve device is operated in a pressure-balanced manner at least at times.

Preferably, a flowable medium and in particular air is directed via the rod-like body onto a bottom portion of a plastic preform and/or plastic container.

Particularly preferably, the plastic container is acted upon after it has already been completely formed into a plastic bottle within the blow mold.

Further advantages and embodiments will be apparent from the accompanying drawings:

In the drawings:

Brief Description of the Drawings

FIG. 3 shows an illustration of a forming station according to the prior art;

FIG. 4 shows a detailed view of the forming station shown in FIG. 3;

FIG. 5 shows a detailed representation of a forming station according to the invention;

FIG. 6 shows a further illustration of a forming station according to the invention;

DETAILED DESCRIPTION OF THE INVENTION

Figure 1:
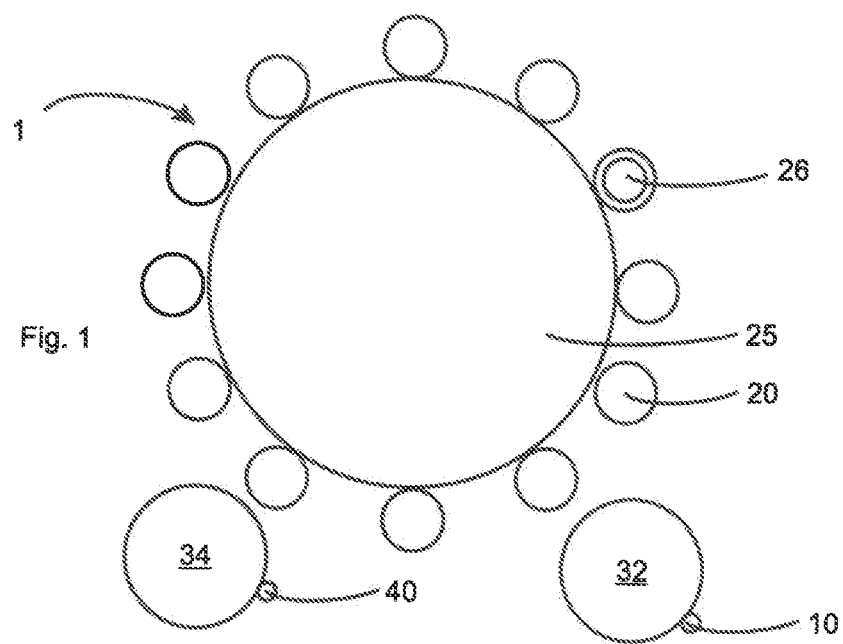
FIG. 1 shows a schematic representation of a plant for forming plastic preforms into plastic containers.

FIG. 1 shows a schematic representation of a forming device 1 for forming plastic preforms 10 into plastic containers and in particular plastic bottles 40. A feed device such as a feed starwheel 32 is provided, which transfers heated plastic preforms to a plurality of forming stations 20. These are thereby arranged on a rotatable carrier 25, such as in particular a so-called blowing wheel. In these forming stations, the plastic preforms 10 are formed into the plastic containers 40 and then transported away by a discharge device 34, such as a discharge starwheel.

The reference sign 26 roughly schematically indicates a blow mold arranged in the forming station 20. This blow mould can have two side parts which can be pivoted relative to one another with respect to an axis in order to open and close the plastic preforms.

Figure 2:
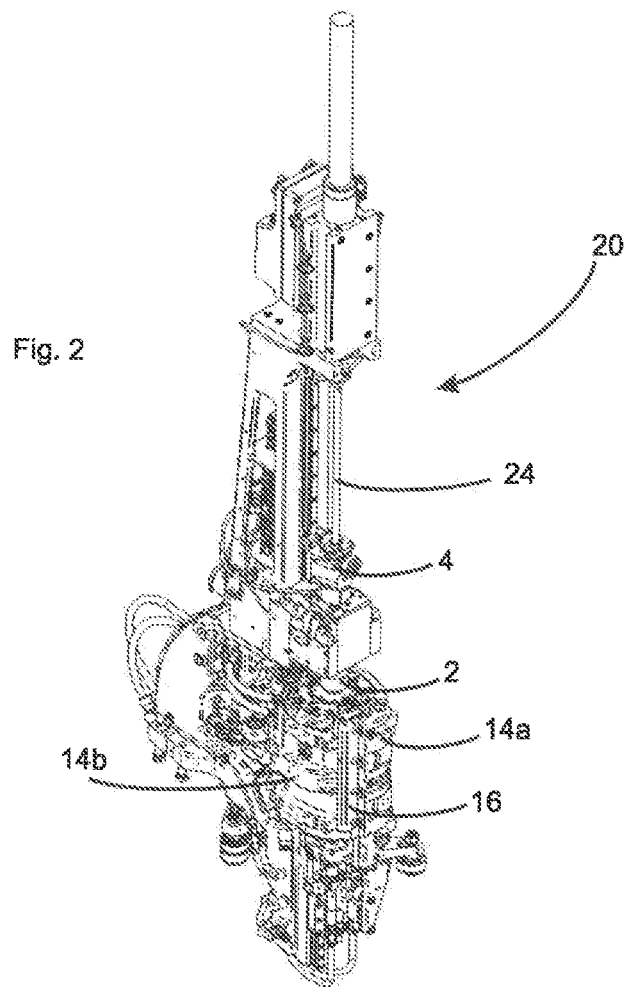
FIG. 2 shows an illustration of a forming station.

FIG. 2 shows a representation of a forming station 20, which has a rod-like body 24 such as a stretching bar, which can be inserted into the interior of the plastic preforms for stretching them. The reference sign 4 indicates a movement device which moves this stretching bar for this purpose.

The reference sign 2 indicates an application device which acts upon the plastic preforms with a flowable medium and in particular with compressed air. The reference signs 14a and 14b indicate side part carrier which are suitable and intended for supporting and holding the blow-molded parts of the blow mold 26. The reference sign 16 indicates a locking device which holds the two blow mould parts or their side part carrier 14a and 14b together or locks them together during an expansion of the plastic preforms.

FIG. 3 shows a detailed representation of a forming station according to the prior art. Here, a carrier is provided on which a movement element 52 is arranged. The rod-like body 124 is in turn arranged on this movement element 52. The reference sign 108 indicates a valve device, which is connected to the rod-like body via a conduit 126 such as a hose. The interior of this hose forms a dead space volume, which is to be reduced according to the invention.

FIG. 4 shows a detailed view, wherein only the valve means 108, the conduit means 126 and the rod-like body 24 are shown.

FIG. 5 shows a forming station according to the invention. Here again, a movement element 52 such as a stretching carriage is provided. This movement element can be a component of the movement device mentioned above. However, in this embodiment the valve device 8 is arranged directly on the rod-like body 24. The reference sign 46 indicates a working air feed line which is connected to a connection 44 of the valve device 8 via a connection line 42 which, however, is preferably rigid in this case. In this way, the connecting hose 126 shown in FIG. 4 can be dispensed with and in this way the dead space volume is significantly reduced. More specifically, the valve device is preferably arranged directly on the rod-like body 24. Thus, preferably the valve device also moves with the rod-like body 24.

FIG. 6 shows a further illustration of a forming station according to the invention. The reference sign 46 refers to a control air feed line in the event that the valve device is designed as a pneumatic valve.

Figure 7:
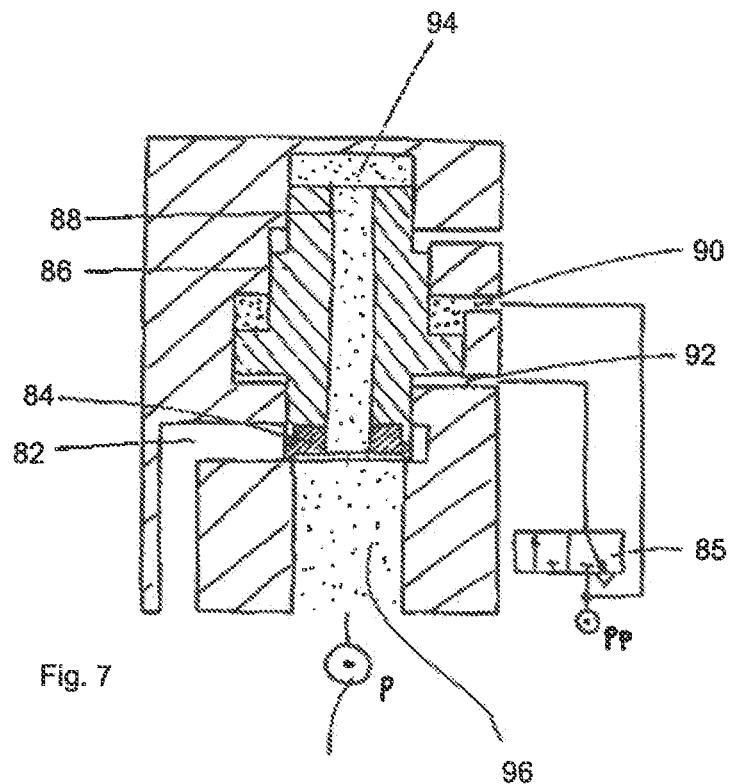
FIG. 7 shows a representation of a valve device.

FIG. 7 shows a detailed representation of an advantageously used valve device, which is designed here as a pressure-balanced valve. Here, the reference sign 82 indicates the valve device and the reference sign 84 indicates a valve seal.

The reference sign 85 indicates a pilot valve, which is used in particular for actuating the valve device. Reference signs 90 and 92 indicate a control chamber and in particular the control chamber controlled by the pilot valve.

The reference sign 88 indicates a connecting space between a sealing side and a piston rear side, via which the pressure compensation is effected, and the reference sign 94 indicates the pressure chamber of the piston rear side. Reference sign 86 indicates the piston of the valve device.

Figure 8:
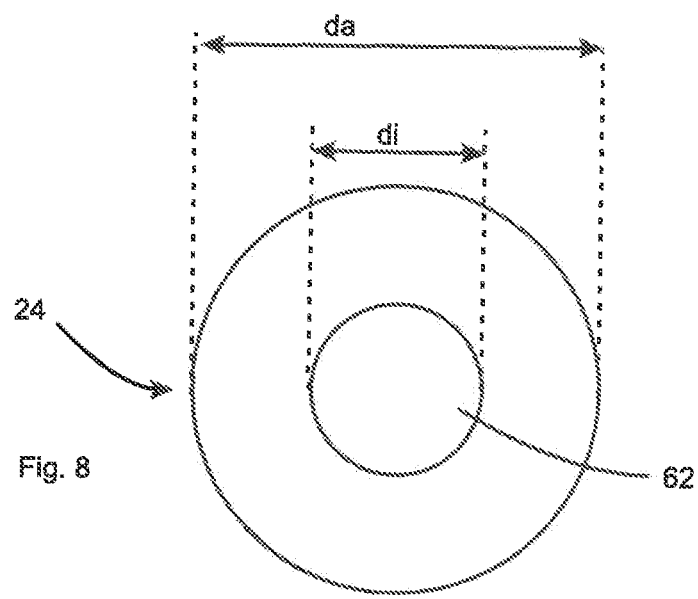
FIG. 8 shows a representation of a rod-like body.

FIG. 8 shows a sectional view of a rod-like body 24 or a stretching bar. Here, the reference signs di and da refer to the inner diameter and the outer diameter of this rod-like body. It can be seen that the rod-like body 24 preferably has a cylindrical profile. Also, the cavity or channel 62, which here is in the form of a bore, is preferably cylindrical in shape.

The applicant reserves the right to claim all features disclosed in the application documents as essential to the invention, provided that they are individually or in combination new compared to the prior art. It is further pointed out that the individual figures also describe features which may be advantageous in themselves. The skilled person immediately recognizes that a particular feature described in a figure can be advantageous even without adopting further features from that figure. Furthermore, the skilled person recognizes that advantages can also result from a combination of several features shown in individual figures or in different figures.

LIST OF REFERENCE SIGNS

1 forming device
2 application device
4 movement device
8 valve device
10 plastic preform
14*a* side part carrier
14*b* side part carrier
20 forming stations
24 rod-like body, stretching rod
25 carrier
26 blow mold
32 feeding starwheel
34 discharge device
40 plastic bottles
42 connection line
44 connection
46 working air feed line
52 movement element, stretching carriage
62 channel
82 valve output
84 valve seal
85 pilot valve
92 control chamber
90 control chamber
88 connection chamber between seal side and piston rear side
86 piston
94 pressure chamber rear side of piston
108 valve device (state of the art)
124 rod-like body (state of the art)
126 conduit means
di internal diameter
da outside diameter

The invention claimed is:

1. An apparatus for forming plastic preforms into plastic containers, having at least one forming station configured to form the plastic preforms into the plastic containers by being acted upon by a flowable medium, wherein the forming station has a blow mould configured to form a hollow space within which the plastic preforms can be formed into the plastic containers, and wherein the forming station further comprises an application device configured to act upon the plastic preforms with the flowable medium and a rod-like body configured for introduction into the plastic preforms via a mouth of the plastic preforms, and a moving device which is configured to move the rod-like body in the longitudinal direction of the plastic preforms, wherein the rod-like body forms a channel configured for conducting the flowable medium, and the forming station comprises valve device configured to control the feed of the flowable medium into the channel,
wherein
said valve device is arranged at the moving device, and a ratio between an inner diameter of said rod-like body and the outer diameter of said rod-like body is smaller than or equal to 0.5 at least in sections.

2. The apparatus according to claim 1, wherein a movement of the valve device is at least temporarily coupled to the movement of the rod-like body.

3. The apparatus according to claim 1, wherein the valve device is pressure-balanced.

4. The apparatus according to claim 1, wherein the valve device is a pneumatically actuated valve.

5. The apparatus according to claim 1, wherein the valve device is arranged at a portion of the rod-like body.

6. The apparatus according to claim 1, wherein the rod-like body is made of a metal.

7. The apparatus according to claim 1, wherein the rod-like body is coated at least in sections.

8. The apparatus according to claim 1, wherein the material of the rod-like body is a semi-finished product.

9. A rod-like body for stretching plastic preforms, wherein the rod-like body has a channel configured for conducting a flowable medium and the rod-like body has a predetermined outer diameter as well as a predetermined inner diameter and the rod-like body has a length of between 500 mm and 1000 mm, wherein
the rod-like body is made of a metal, and a ratio between the inner diameter and the outer diameter is less than or equal to 0.5.

10. A method for forming plastic preforms into plastic containers using a forming station for forming the plastic preforms into the plastic containers by acting upon the plastic performs with a flowable medium, wherein the forming station comprises a blow mould which forms a cavity within which the plastic preforms are formed into the plastic containers, and wherein the forming station further comprises an application device which acts upon the plastic preforms with the flowable medium and a rod-like body which is inserted into the plastic preforms via a mouth of the plastic preforms, and wherein a moving device moves said rod-like body in the longitudinal direction of the plastic preforms, wherein said rod-like body forming a channel for guiding the flowable medium, and a valve device of the forming station controls the supply of the flowable medium into said channel, wherein
said valve device is arranged on the moving device, and a ratio between an inner diameter of the rod-like body and the outer diameter of the rod-like body is smaller than or equal to 0.5 at least in sections.

11. The apparatus according to claim 1, wherein the moving device comprises a carriage configured to move in a longitudinal direction.

12. The apparatus according to claim 1, wherein the valve device is arranged in proximity to the rod-like body and the rod-like body is inserted into a housing of the valve device.

13. The apparatus according to claim 2, wherein a movement of the valve device is completely coupled to the movement of the rod-like body.

14. The apparatus according to claim 1, wherein the valve device and the rod-like body are arranged on the same carrier.

15. The apparatus according to claim 3, wherein the valve device is configured such that one side of the valve piston is also acted upon with a predetermined pressure.

16. The apparatus according to claim 4, wherein a control air feed is provided, which serves to actuate the valve device.

17. The apparatus according to claim 5, wherein an outlet connects the valve device directly to the rod-like body to further reduce dead space.

18. The method according to claim 10, wherein the valve device is operated in a pressure-balanced manner at least at times.

* * * * *